INVENTOR.
HAROLD O. KRUGER

United States Patent Office 3,192,017
Patented June 29, 1965

3,192,017
CONTINUOUS RECORDING TITRATOR
Harold O. Kruger, San Marino, Calif., assignor to Beckman Instruments, Inc., a corporation of California
Filed July 3, 1962, Ser. No. 207,346
3 Claims. (Cl. 23—253)

This invention relates to a method of titrating and apparatus therefor and more particularly relates to a titrating method and apparatus for continuously monitoring a desired characteristic of a sample stream.

In many process industries it is necessary or desirable to continuously monitor one or more characteristics to determine within narrow limits their concentration in the process stream. Since the analytical method of titration is ideally suited for these determinations, various schemes have been proposed for continuously titrating a flowing stream.

The simplest and earliest method of performing this monitoring was to assign an analyst to periodically remove a sample from the stream and titrate it to an end point, and make a record of the amount of titrant necessary to reach each successive end point so that changes in the monitored characteristics could be determined and compensated for if necessary. This method has the obvious disadvantage of requiring the constant attention of a skilled analyst. This disadvantage was overcome by providing automatic apparatus for taking a sample from the process stream, initiating a titration, and recording the amount of titrant utilized in reaching the end point.

This method is satisfactory in processes where small changes in stream characteristics are not important or where transient aberrations in stream characteristics are unlikely. However, in those processes where maintenance of stream characteristics within narrow limits is critical, the periodic sampling method is unsatisfactory because of the time lag involved between change of characteristic and its detection.

In order to continuously monitor a stream, it has been proposed to utilize a plurality of constant volume metering pumps operating in phase to pump a known amount of sample from the stream and a known amount of reagent from a suitable supply into a titration chamber whose characteristic is continuously sensed by any suitable apparatus, for example, an indicating electrode and a reference electrode. Any change in the characteristic of the fluid in the chamber will indicate that there has been a change in the characteristic in the process stream. The output of the sensing apparatus may be used to control a servo motor to make changes in the process to bring the stream characteristic back to the desired value, or the servo motor may be used to vary the flow rate of the reagent metering pump and record these variations, which then gives a direct indication of the titer of the sample stream.

Because of the nature of the titration process, such a system requires the use of an electronic or pneumatic proportional controller between the sensing system and the servo motor. This is necessary because of the wide variance in effect that the addition of a given amount of titrant will have on the sensing system, depending on the nearness of the titration to its end point. If the solution is far from the end point, large amounts of titrant may be added with little effect; however, if the solution is near its end point, the smallest amount of added titrant will have a pronounced effect on the system. Thus, the controller must be designed to enable the servo system to make large changes in system conditions when the changes in the output of the sensing system are small, and only permit small changes when changes in the output of the sensing system are large. These controllers, however, are expensive in the first instance, and the determination of their proper proportional and reset rates in order to achieve satisfactory operation is often difficult and time-consuming.

According to the present invention, it has now been found that a continuous titrator may be provided which has no need for a proportional controller. This simplification of apparatus is achieved by the novel use of a pair of metering pumps operating out of phase to cause a regular swing in the characteristic of a solution in a titration chamber, rather than attempting to provide a servo system to maintain this characteristic at a desired value as has been done heretofore. This swinging of solution characteristic is used to obtain average-position mode type control of the analysis and thus to eliminate the need for a separate proportional controller. The use of such apparatus also eliminates the need for studying the response of the system for determining proportional and reset rates and enables satisfactory operating conditions to be described in terms of the characteristic swing.

It is therefore a primary object of the present invention to provide a continuous titrator which utilizes average-position mode type control for indicating the characteristic of a sample solution.

It is also an object of the present invention to provide a continuous titrator in which a pair of pumps operating out of phase cause a regular swing in a characteristic of a solution in a titrating chamber.

It is another object of the present invention to provide a simple control circuit for a continuous titrator having a pair of pumps operating out of phase to provide sample and reagent to a titrating chamber.

It is a further object of the invention to provide a method of continuously monitoring a sample stream.

These and further objects and advantages of the invention will become more apparent upon reference to the following specification and claims and appended drawings wherein:

Figure 1:
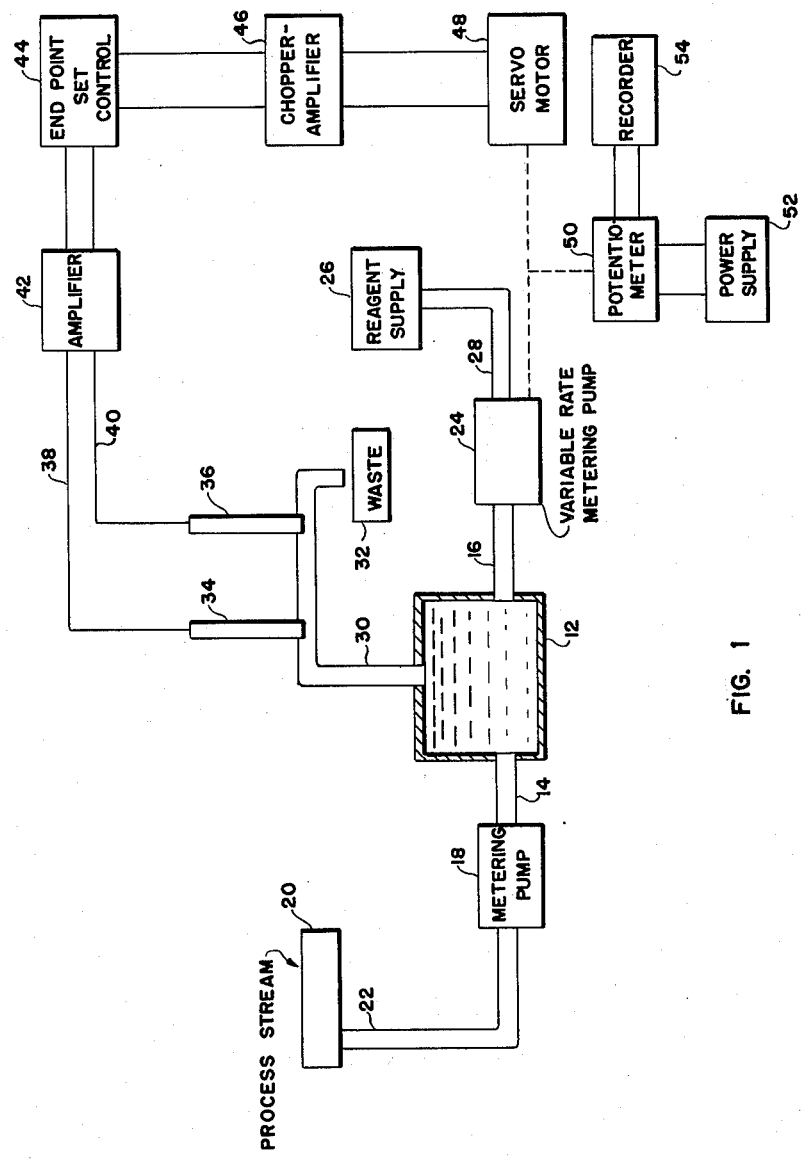
FIG. 1 is a block diagram of the apparatus of the present invention.

Referring now to FIG. 1, there is shown a continuous titrator in which the titration chamber 12 is supplied by a pair of inlet conduits 14 and 16. The conduit 14 is connected to the output of a precision metering pump 18 having a pulsating flow and a variable output stroke, for example, a Beckman Solution Metering Pump No. 746. The inlet of the pump 18 is connected to the process stream 20 by a suitable tap 22 so that the pump 18 continually pumps pulses of sample into the titration chamber 12.

The inlet conduit 16 is coupled to the output of a pump 24 similar to the pump 18. The inlet of the pump 24 is coupled to a suitable supply of reagent 26 by means of a conduit 28. The pump 24 thus acts to pump pulses of reagent into the titration chamber 12. The pumps 18 and 24 are arranged so that they are out of phase, thereby causing a pulse first of sample and then of reagent to be introduced into the titration chamber 12. Preferably, the pumps are 180° out of phase although any phase difference will be sufficient for system operation.

The titration chamber 12 is provided with an outlet conduit 30 that leads to waste 32. As may be seen, each time a pulse of sample or reagent is introduced into the titration chamber 12 by the pumps 18 and 24, a pulse of liquid of equal volume will be discharged through the conduit 30 to waste. A sensing device is associated with the conduit 30 to determine the characteristic of the solution flowing therethrough. As illustrated, this sensing apparatus takes the form of a pair of electrodes 34 and 36 which are connected by conductors 38 and 40 to the inputs of an amplifier 42. It should be understood, however, that any form of titration end point detection device could be used according to the present invention. For example, the conduit could be transparent and a colorimeter used to determine the characteristic of the solution flowing therethrough. The detection device could also be associated with the chamber 12 rather than with the conduit 30 if such is desired. For the purposes of this description, the characteristic of the sample to be monitored will be considered to be its pH and thus the electrodes 34 and 36 would be a suitable glass electrode and reference electrode respectively. It should be understood, however, that any other electrode system may be used in the place of the pH electrodes to determine other solution characteristics.

The output of the amplifier 42, which preferably is a part of a suitable pH meter, is compared with a preset reference voltage in an end point set control 44. The error signal is amplified in a chopper amplifier 46 and impressed on the control windings of a servo motor 48. The servo motor 48 is mechanically linked to the variable stroke control of the reagent supply pump 24 and to a potentiometer 50. The potentiometer 50 is connected to a power supply 52 and a suitable potentiometric recorder 54 so that the error signal indicated by the movement of the servo motor output shaft is continuously recorded.

In considering the operation of this apparatus, let it first be assumed that the hydrogen ion concentration of the process stream is at the desired value. The electrodes 34 and 36 therefore produce an output signal that oscillates around the set point in response to the pumping of first sample and then reagent into the titration chamber and their subsequent mixing therein. The amplified electrode output is compared with the desired setpoint in the end point control 44 and the resultant error signal applied to the servo motor 48. This fluctuating error signal, of course, corresponds to the ripple impressed on the electrode output as a result of the out-of-phase operation of the pumps. This fluctuating signal causes the servo motor output shaft to oscillate slightly; however, this has no net effect on system operation as each change in pump output caused by shaft oscillation in one direction is offset by the next change caused by shaft oscillation in the other direction. This shaft oscillation will cause a ripple to be shown on the recorder trace which may in some instances be undesirable. This ripple may conveniently be removed by providing a suitable coupling, for example, a flexible sleeve, between the motor output shaft and the potentiometer and pump drive which enables the motor shaft to travel slightly without imparting motion to the drive mechanism, but which transfers motion when a certain angular rotation has been exceeded.

Assume now that the hydrogen ion concentration in the process or sample stream increases. When the pump 18 next introduces a pulse of the sample into the titration chamber 12, the solution concentration of hydrogen ion will be appreciably higher than before. The pump 24 then introduces a pulse of reagent into the chamber 12, causing a portion of the solution to be discharged through the conduit 30. Since this pulse of solution is higher in hydrogen ion concentration than were previous pulses, the electrodes 34 and 36 generate an output signal greater than the preselected setpoint, with the result that an error signal is applied to the servo motor 48 causing its output shaft to rotate further in the first direction than heretofore and driving the potentiometer and recorder pen to a new position. The stroke of the pump 24 is also changed to deliver a greater volume of reagent.

The pump 18 now delivers a pulse of the sample to the chamber 12 with the result that solution is again discharged through the conduit 30. This solution will be more basic than the previous pulse because of added reagent, but not as basic as would normally be the case if the sample concentration had remained unchanged. The error signal applied to the servo motor 48 will thus be less than normal, with the result that the net effect of the two successive error signals is to displace the zero position of the servo motor output shaft in the first direction. This displacement will continue until the increased volume of reagent delivered to the chamber 12 compensates for the increased concentration of the sample solution. At this point, the servo motor output shaft will again oscillate around a new zero position and has no effect on system operation. The recorder trace will indicate the new volume of reagent being delivered which, of course, gives a direct indication of the titer of the process stream. If the hydrogen ion concentration of the sample should decrease, the system would operate in the same fashion to decrease the volume of reagent delivered to the chamber 12 by the pump 24.

It can thus be seen that a method and apparatus has been provided for continuously titrating a sample that does not require an expensive electronic or pneumatic proportional controller, but rather uses average-position type control to achieve the same results. The system may be used to merely continuously monitor the characteristics of interest of the sample solution, or may be used to control factors governing these characteristics, as will be apparent to those skilled in the art. By observing the pH meter (or similar meter if other characteristics are being monitored) which includes the amplifier 42, the operating conditions of any particular analysis can satisfactorily be described in terms of pH swing. By properly sizing the volume of the titration chamber 12 with respect to the volume of the solutions pumped, a swing may be chosen to cover any desired portion of a titration curve. It has generally been found that a pH swing of 20% to 50% of the distance from the end point to the knees of the titration curve is preferable for most analyses.

Figure 2:
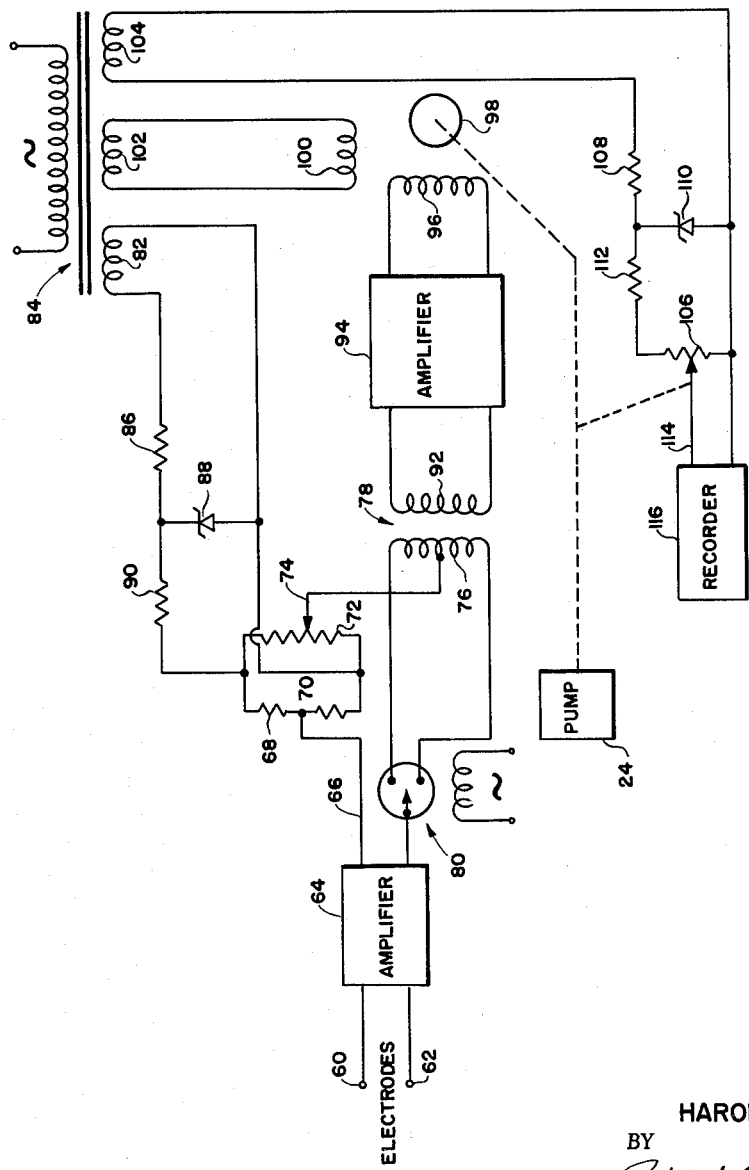
FIG. 2 is a schematic diagram of a preferred form of the control circuit of the present invention.

Referring now to FIG. 2, there is shown the preferred embodiment of the control circuit of the present invention. A pair of electrodes 60 and 62, for example a glass electrode and a reference electrode for making pH determinations, are connected to the input of an electrometer amplifier 64. These amplifiers are well known to those skilled in the art and are characterized by having an extremely high input impedance. One output of the amplifier 64 is connected to the junction of resistors 68 and 70 which together with potentiometer 72 make up a resistance bridge network. The wiper arm 74 of the potentiometer 72 is connected to the center tap of the primary 76 of a transformer 78. The ends of the primary windings 76 are connected to the two fixed contacts of a chopper 80. The resistance bridge network is supplied with a constant input voltage by means of the secondary winding 82 of a transformer 84, a resistor 86, a Zener diode 88 connected across the winding 82, and a dropping resistor 90. The primary winding of the transformer 84 is coupled to a suitable alternating current power supply.

The secondary winding 92 of the transformer 78 is connected to the input of an amplifier 94 whose output is connected to the control winding 96 of a servo motor 98. The power winding 100 of the servo motor 98 is supplied by means of a secondary winding 102 of the transformer 84. A third secondary winding 104 of the transformer 84 supplies a constant voltage to a potentiometer 106 by means of a resistor 108, Zener diode 110 and resistor 112. The wiper arm 114 of the potentiometer 106 controls the operation of a potentiometric recorder 116 in the manner well known to those skilled in the art. The wiper arm 114, together with the variable stroke control of the reagent metering pump 24, is mechanically driven by the output shaft of the servo motor 98.

In the circuit of FIG. 2, the voltage generated by the electrodes 60 and 62 is amplified by the amplifier 64 and compared by the resistance bridge network with a preselected setpoint which may be determined by means of the potentiometer 72. The difference or error signal is converted into an A.C. signal by means of the chopper 80, amplified by the amplifier 94 and used to control the servo motor 98. As previously described in connection with FIG. 1, an error signal supplied to the servo motor 98 will cause the volume pumped by the pump 24 to vary until the voltage generated by the electrodes 60 and 62 is again equal to the setpoint value determined by the potentiometer wiper arm 74.

The foregoing description is to be considered illustrative but not restrictive of the present invention. It should be obvious that control systems other than those illustrated are within the scope of the present invention as defined in the appended claims. Although the invention has generally been described in connection with a system in which the pH of a process stream is to be monitored, any other solution characteristic which can be determined by titration is equally well suited to the present invention. Similarly, although potentiometric end point detection is illustrated and described, any suitable detection device for determining the end point of a titration is applicable to the present invention.

What is claimed is:

1. Apparatus for continuously titrating a sample stream with a reagent to monitor a characteristic of the stream, comprising in combination;
   a titration chamber;
   first cyclical pump means for introducing pulses of sample of one phase and one period into said titration chamber;
   second cyclical pump means for introducing pulses of reagent of a phase different from said one phase and a period the same as said one period into said titration chamber having a variable output;
   flow means for discharging fluid from said chamber;
   sensing means for producing a second output indicative of the characteristic of the solution formed by the mixing and chemical reacting of the sample and the reagent;
   means for comparing said second output with a preselected reference and producing an error signal corresponding to the difference between said output and said reference; and
   means coupled to said comparing means and responsive to said error signal, said means being operative to vary the output of said second cyclical pump means and thereby reduce the net difference between said output and said reference to zero.

2. The apparatus of claim 1 wherein recording means are coupled to said signal responsive means for producing a record indicative of the continuous value of the characteristic of said sample stream.

3. Apparatus for continuously titrating a sample stream with a reagent to monitor a characteristic of the stream, comprising in combination;
   a titration chamber having two inlet conduits and an outlet conduit;
   a first pump for introducing pulses of sample of one phase and one period into said titration chamber through a first of said inlet conduits;
   a second pump for introducing pulses of reagent of a phase different from said one phase and a period the same as said one period into said titration chamber through the second of said inlet conduits, said second pump having a variable volume pumping stroke;
   a sensing device associated with said outlet conduit for producing an output indicative of the characteristic of the fluid flowing therethrough;
   means coupled to said sensing device for amplifying said output;
   means for comparing said amplified output with a preselected reference and producing an error signal corresponding to the difference between said output and said reference;
   means coupled to said comparing means and responsive to said error signal, said means being operative to vary the pumping stroke of said second pump and thereby reduce the net difference between said output and said reference to zero; and
   a recorder coupled to said error signal responsive means for producing a record indicative of the continuous value of the characteristic of said sample stream.

References Cited by the Examiner

UNITED STATES PATENTS 2,977,199  3/61  Quittner _____ 23—230

MORRIS O. WOLK, *Primary Examiner.*

JAMES H. TAYMAN, JR., *Examiner.*